Oct. 28, 1947.  C. G. PULLIN  2,429,646
HELICOPTER
Filed April 22, 1943  6 Sheets-Sheet 1
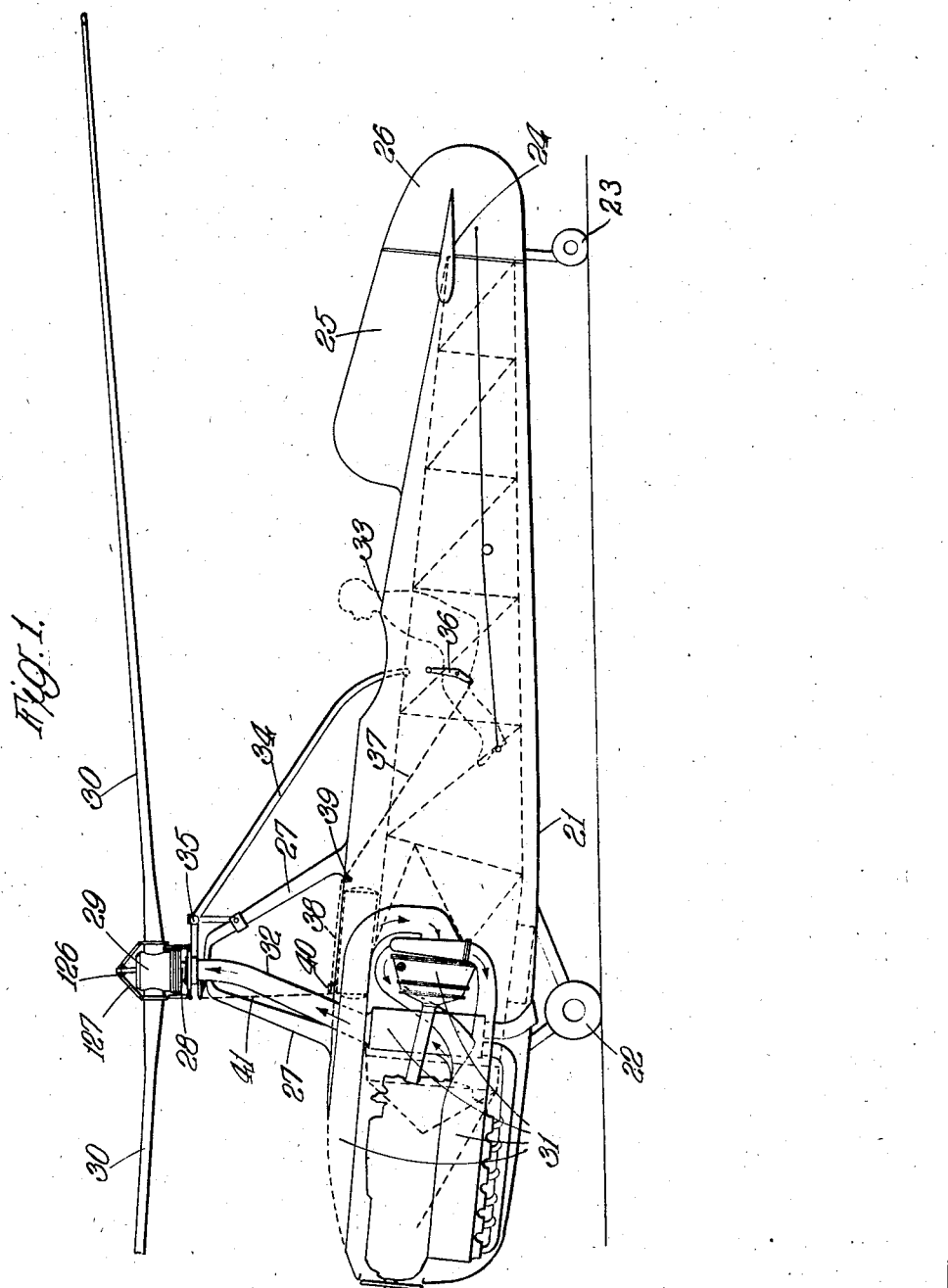
INVENTOR
CYRIL G. PULLIN
BY
ATTORNEYS Oct. 28, 1947.   C. G. PULLIN   2,429,646
HELICOPTER
Filed April 22, 1943   6 Sheets-Sheet 2
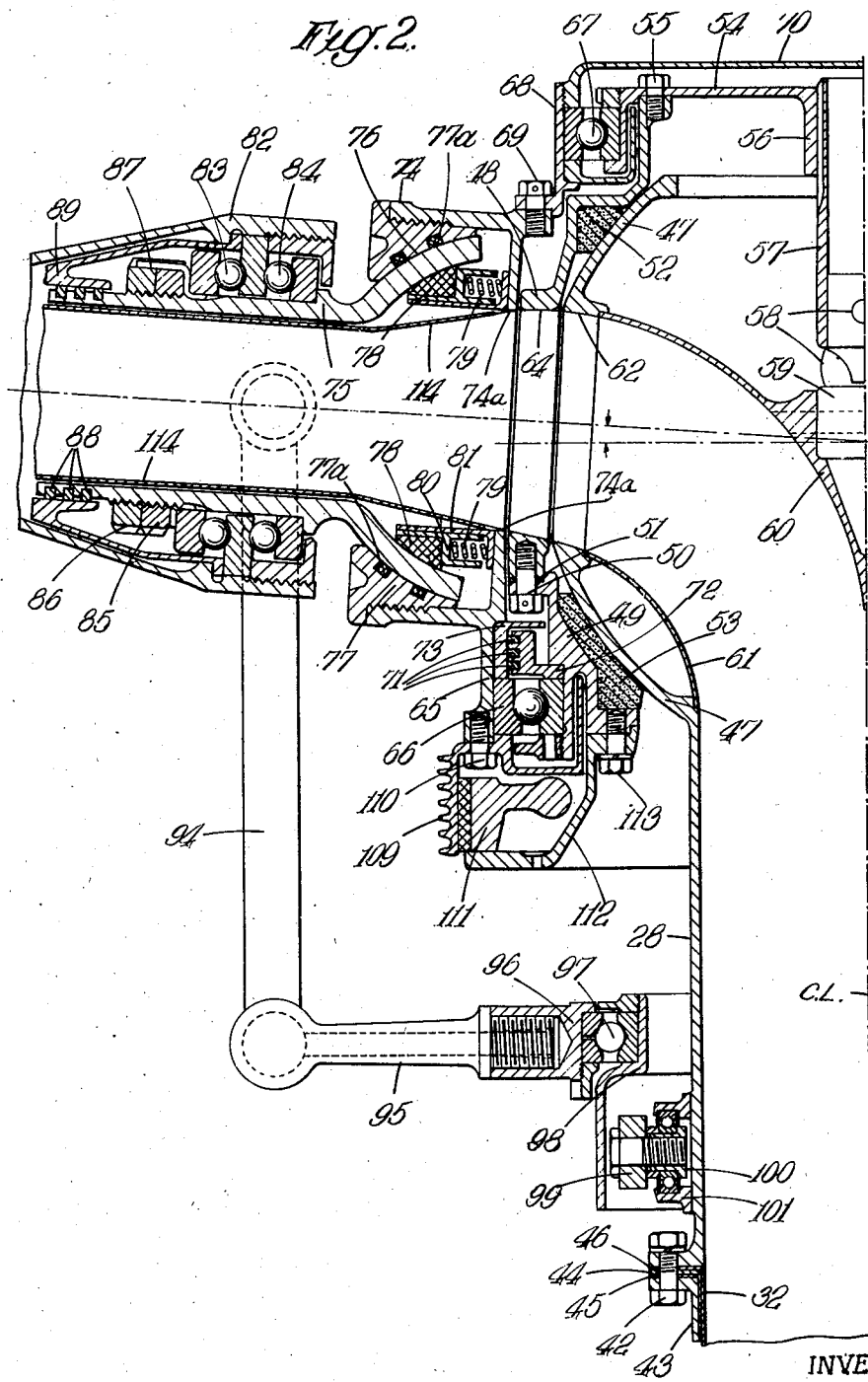
INVENTOR
CYRIL G. PULLIN
BY
ATTORNEYS Oct. 28, 1947.   C. G. PULLIN   2,429,646
HELICOPTER
Filed April 22, 1943   6 Sheets-Sheet 3
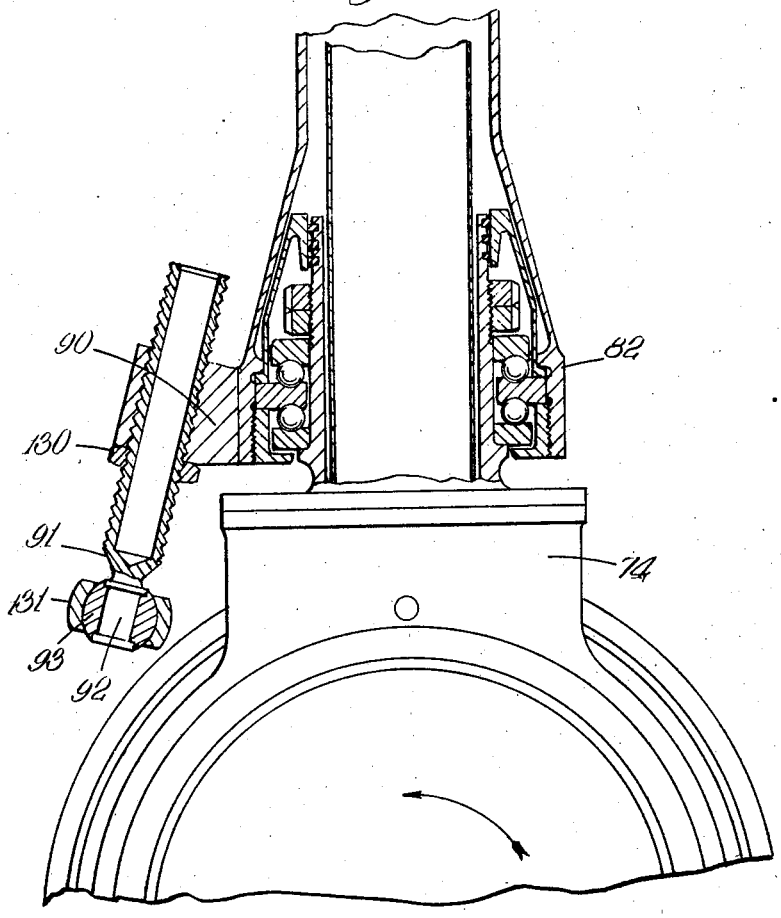
INVENTOR
CYRIL G. PULLIN
BY
ATTORNEYS

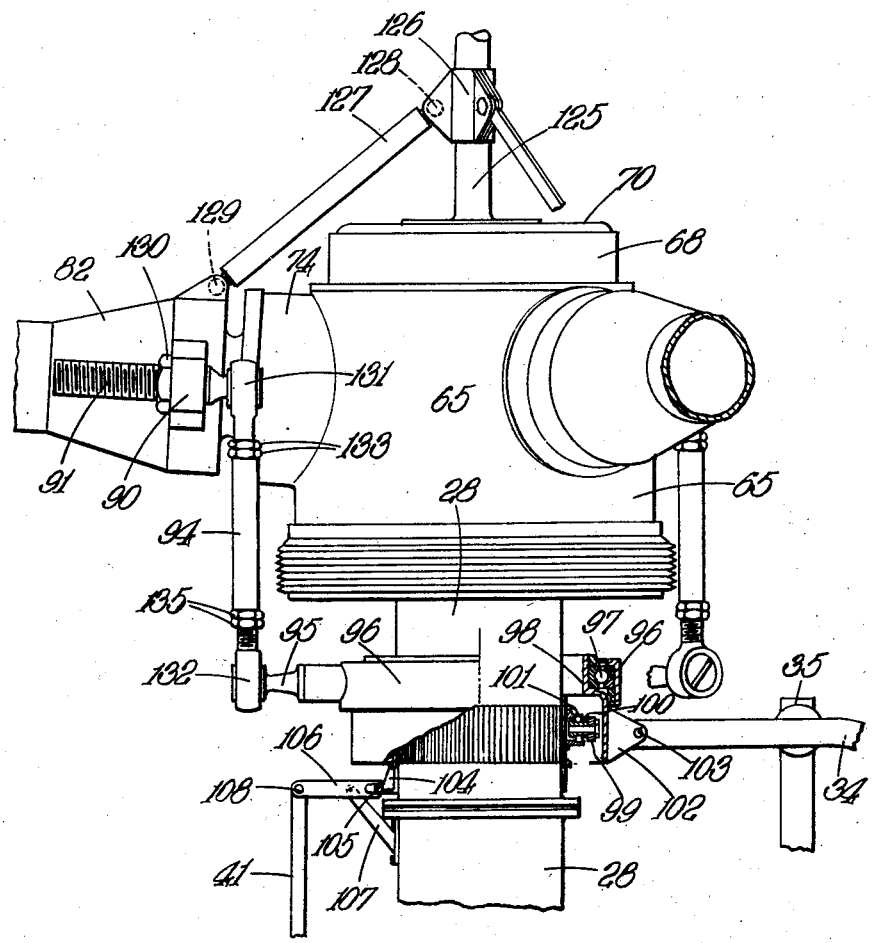

Oct. 28, 1947.    C. G. PULLIN    2,429,646
HELICOPTER
Filed April 22, 1943    6 Sheets-Sheet 5
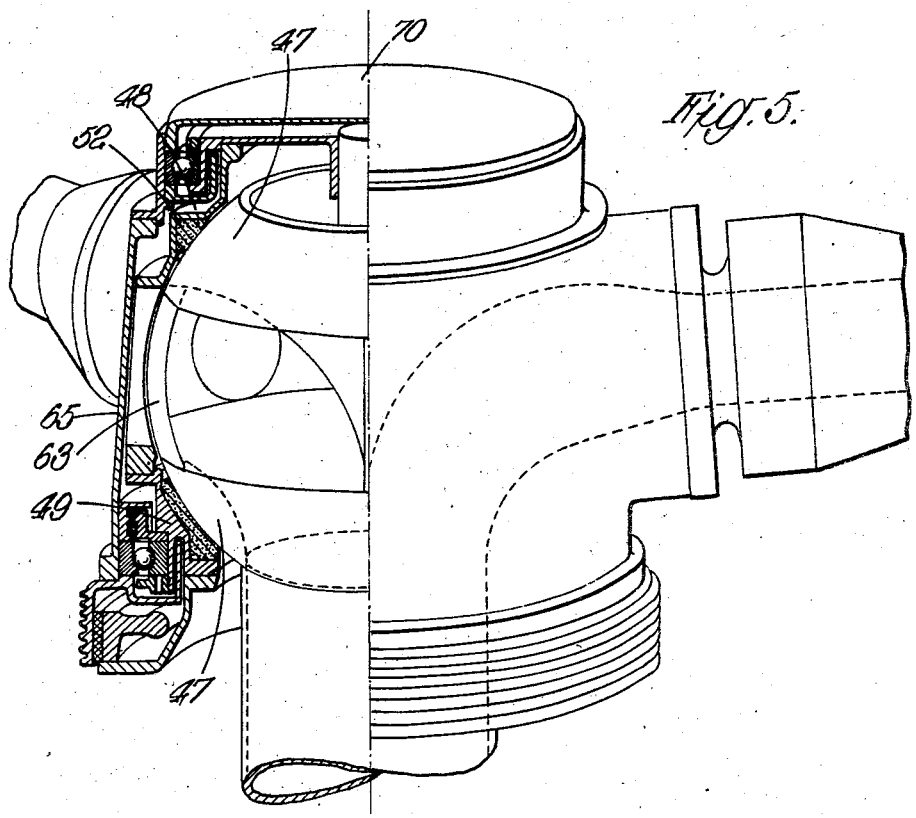
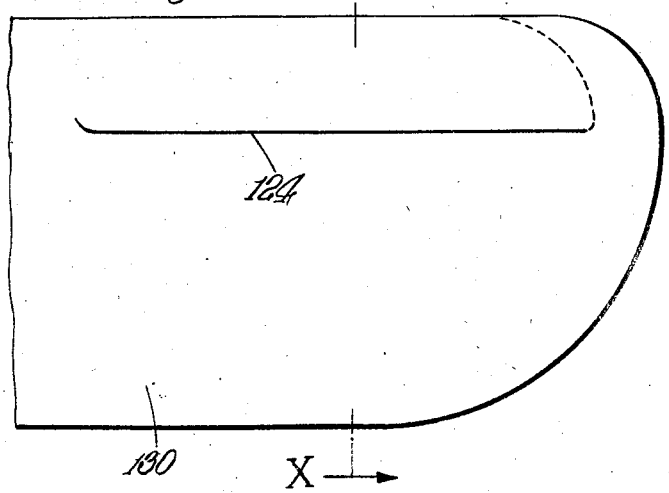
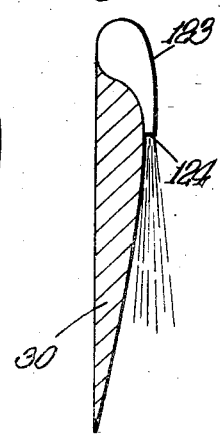
INVENTOR
CYRIL G. PULLIN
BY
ATTORNEYS

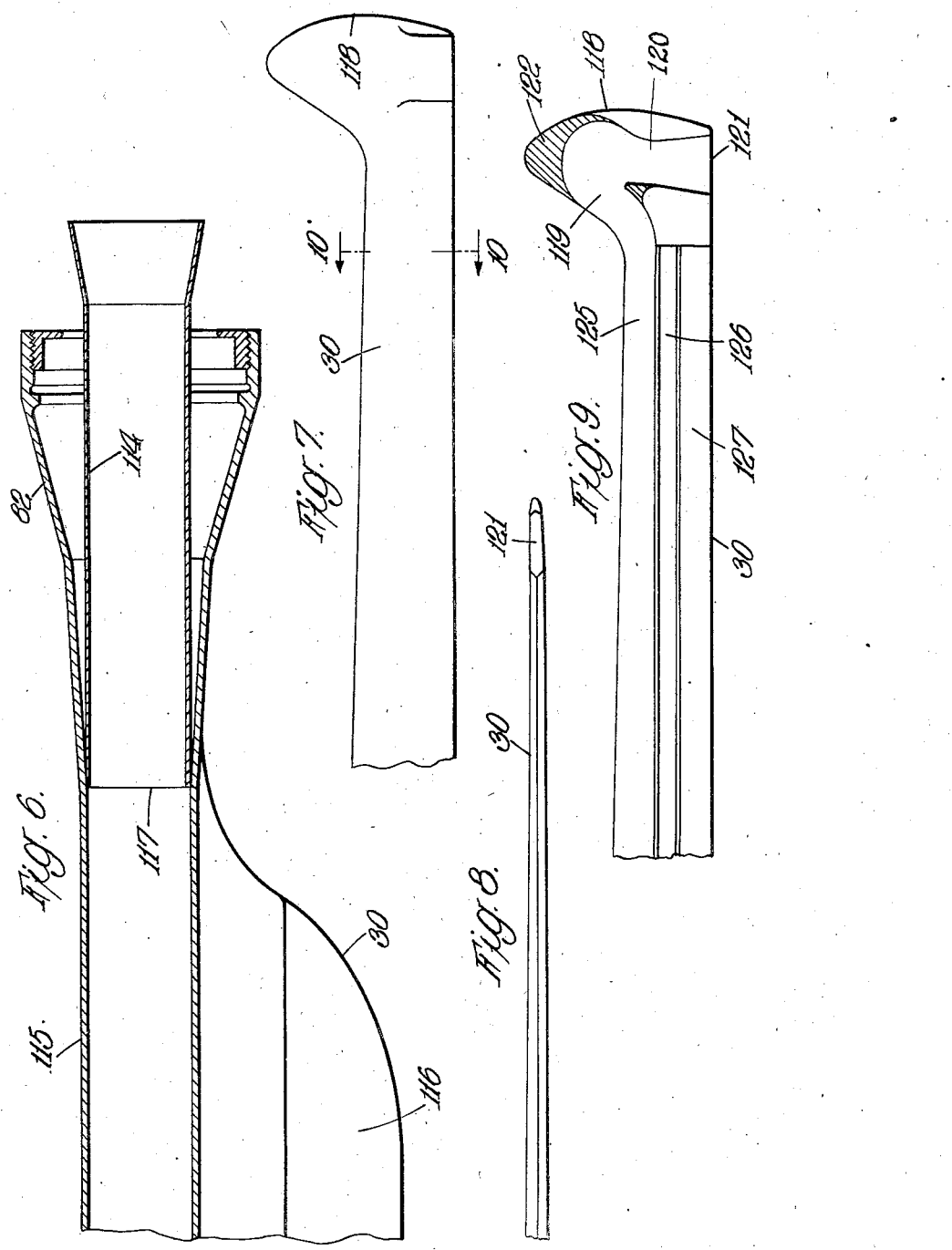

Patented Oct. 28, 1947

2,429,646

UNITED STATES PATENT OFFICE 2,429,646

HELICOPTER

Cyril George Pullin, Langside, Glasgow, Scotland

Application April 22, 1943, Serial No. 484,063
In Great Britain April 22, 1942

21 Claims. (Cl. 244—17)

REISSUED
DEC 25 1951
RE 23448

This invention relates to helicopters.

An object of the invention is a closer approach to a solution of the problems of stability and controllability, especially at low translational speeds, as when hovering and rising from the ground.

My researches indicate that this problem is closely connected with that of eliminating torque reaction between the aircraft and its rotor (or rotors) and that if the rotor is "torque-locked" to the rest of the aircraft, i. e. that there is torque reaction between them, the stability characteristics of the rotor cannot be separated from those of the rest of the aircraft, but that the aircraft-rotor assembly must be treated as a whole. This introduces so many factors into the problem that its solution is a matter of great difficulty.

Broadly the present invention consists in combining with a lifting rotor having inherently stable characteristics (in free rotation, i. e. rotation without torque reaction), means for driving the rotor by jet reaction applied to the blades themselves, thus entirely eliminating torque reaction between the rotor and body.

More particularly the rotor comprises the following features, conducive to inherent stability:

(a) The non-rotative member of the rotor hub assembly is mounted on the aircraft body by means of a spherical or universal joint on which it can pivot freely in any vertical plane;

(b) The blades are mounted on the said rotative member so as to be free to turn about their radial axes and vary the blade pitch.

A preferred form of construction also comprises the following features:

(c) The rotor blades are so constrained (with reference to the rotative hub member) that the path swept by the blade tips is always coaxial with the rotative member of the hub assembly;

(d) The blades are connected to a swash plate or equivalent mechanism such that a change of attitude of the blade tip path relatively to the swash plate causes a cyclical variation of blade pitch tending to restore coaxiality or parallelism of the axes of the blade tip path and the swash plate.

Flying control is obtained by connecting the swash plate to the pilot's controls, so that control movements vary the attitude of the swash plate in any azimuth.

In addition the blades may be so mounted as to be capable of varying their coning angle, the constraint referred to under heading (c) above ensuring that all the blades vary their coning angle equally.

Preferably the centre of the spherical or universal joint referred to under heading (a) above is arranged to coincide with the vertex of the cone in which the blade axes lie when the blades are at their normal coning angle, which depends only on the R. P. M. of the rotor and its thrust.

It will be seen that the connection of the blades to the swash plate not only causes a cyclical variation of blade pitch angle when the axes of the blade tip path and of the swash plate diverge but also causes an equal decrease or increase of pitch angle of all the blades when the coning angle increases or decreases respectively.

The rotor blades are provided with jet reaction nozzles, preferably near or at their tips directed rearwardly (with reference to the direction of rotation), which nozzles are fed with a working fluid from a "generator" carried in the aircraft body, the fluid being led through suitably disposed passages within the hub assembly and the blades themselves and the articular and rotative joints of the hub assembly and of the blade mountings being provided with suitable seals. The "generator" in this context is any suitable device for providing a stream of working fluid of appropriate mass flow and imparting to this stream the required energy.

The blade mounting articulations as well as providing for twisting (pitch change) and coning of the blades may also allow lead/lag displacements of individual blades, if desired.

A helicopter of the preferred form hereinbefore described will have the following functional characteristics:

(i) There will be no torque reaction between the rotor and the body;

(ii) The angular velocity of the rotor will be steady, i. e. there will be no periodic fluctuations, owing to the absence of "Hookes joint" effect, because, whatever the relative attitude of blade tip path and aircraft body, the blades do not "flap" relatively to the rotative member of the hub assembly;

(iii) For the same reason no centrifugal couples are imposed on the rotor hub and its mounting;

(iv) The rotor is not directly constrained with respect to the aircraft body, the only constraint being an indirect one, exercised by the swash plate, operating by varying the amplitude and azimuth of the cyclic pitch variation of the blades;

(v) Change of attitude of the blade tip path relatively to the aircraft body is self-compensating owing to the induced change of cyclic pitch variation;

(vi) Axial gusts are self-compensating, owing to the change of mean pitch angle caused by change of coning angle;

(vii) The R. P. M. are self-governing, for the same reason as in heading (vi) above;

(viii) No couples are transmitted from the rotor to the aircraft body, but only simple forces, viz. thrust along the axis of the blade tip path and in translational flight a small down wind force; there may also be a small cross wind force. The last two forces are merely equivalent to a slight displacement of the thrust axis from coincidence with the axis of the blade tip path and do not affect the pendular stability of the aircraft;

(ix) The flying controls are substantially irreversible and embody what is in effect a "servo"-action.

Another feature of the invention consists in utilizing the jet reaction nozzle devices for mass balancing the rotor blades, by placing them so that the C. G. of the blade is brought far enough forward, i. e. toward the leading edge, to ensure that the resultant of inertia, centrifugal and aerodynamic forces acting on the blade does not cause excessive twisting of the blade and constitutes with the elastic restoring forces of the blade a stable system which will not give rise to flutter.

A further feature of the invention consists in providing adjustable connections between the swash plate and the blades, such that the "gear ratio" between angular displacement of the swash plate relatively to the blade tip path and amplitude of cyclic pitch variation may be varied within wide limits. Alteration of the adjustment will also vary the gear-ratio between change of coning angle and change of mean blade pitch.

If desired the swash plate datum may be bodily movable in the (mean) axial direction, being provided with a suitable additional control for this purpose, whereby the mean pitch angle of the rotor blades may be varied.

The jet reaction nozzles are preferably placed at or close to the rotor blade tips in order to obtain the best ratio between the discharge velocity and the circumferential velocity of the nozzles.

In one preferred arrangement the nozzle orifices are so disposed as to be flush with the trailing edge of the blade aerofoil section. In an alternative preferred arrangement the jet orifices are situated on the upper side of the blades at or close to the position of maximum blade thickness. It is considered that the latter arrangement may be advantageous because both the driving and aerodynamic forces will be applied close to the elastic and mass axes of the blade and because the external airstream into which the nozzle discharges has its maximum local velocity in this region.

The accompanying drawings illustrate by way of example only a helicopter embodying the present invention.

In the drawings:

Fig. 1 is a general arrangement view in side elevation, partly sectioned, of the helicopter, being somewhat diagrammatic;

Fig. 2 is a vertical half-sectional view of the central part of the rotor and its mounting structure;

Fig. 3 is a partial plan view, partly sectioned, of the rotor hub and the root of one blade;

Fig. 4 is a view in side elevation of the rotor hub and its mounting structure showing also somewhat diagrammatically the arrangement of the flying controls;

Fig. 5 is an isometric view, partly sectioned, of the rotor hub and its mounting structure;

Fig. 6 is a sectional plan view of the root of one rotor blade;

Fig. 7 is a plan view of the outboard part of one rotor blade;

Fig. 8 is a view of the same in elevation taken from the trailing edge;

Fig. 9 is a sectional plan view of the same;

Fig. 10 is a plan view of the tip of an alternative form of rotor blade; and

Fig. 11 is a view of the same in section along the line X—X.

Referring to Fig. 1, the airframe of the helicopter comprises a body 21, undercarriage 22, tail wheel 23, tail-plane 24, fin 25 and rudder 26. Secured to the top of the body is a rotor-supporting structure comprising legs 27 and rotor mounting member 28 on which is mounted the rotor comprising a hub 29 and radial blades 30.

In the front part of the body is situated a plant generally indicated at 31 for producing a stream of energised gaseous fluid, which may be air compressed and heated with or without the admixture of products of combustion, for driving the rotor by jet reaction. The whole of this plant will hereinafter be referred to for brevity as the "generator." The fluid effluent from this generator is conducted by means of a trunk 32 to the interior of the hollow rotor mounting member 28.

The pilot of the helicopter is indicated in dotted lines at 33, and the flying controls comprise a rocking column 34, supported on the rear pylon leg 27 by a universal joint 35, and a pitch control lever 36 connected by rods 37 and 38 and bell crank levers 39, 40, with an upright rod 41, the rods being indicated by dotted lines. The further connections of the control column 34 and pitch control rod 41 to the mechanism controlling the rotor are illustrated in Fig. 4 and will be further described with reference thereto.

Referring to Figs. 2 to 5, the hollow rotor mounting member 28 is secured at its lower end by bolts 42 to a collar 43 and also to a flange 44 on the upper end of the trunk 32, the joint thus formed being sealed by gaskets 45, 46. The collar 43 is secured by appropriate means (not shown) to the legs 27 of the rotor mounting structure. The mounting member 28 terminates at its upper end in a hollow spherical extension 47 on which is supported a tiltable member consisting of an upper half 48 and a lower half 49 secured together by studs 50, the joint between the two halves being rabbeted and sealed by a gasket 51. The interior of the tiltable member 48, 49 is recessed to take packing rings 52, 53 made of moulded compressed carbon formed with female spherical faces adapted to ride on the male spherical faces of the upper and lower parts of the spherical extension 47 of the hub mounting member, the contact surfaces between the carbon rings 52, 53 and the extension 47 being parts of the same sphere. The purpose of these carbon rings 52, 53 is not only to provide an anti-friction bearing between the mounting member extension 47 and the tiltable member 48, 49, but to provide a gas-tight joint between these members and to ensure this the carbon rings may be lapped onto the faces of the extension 47 with which they cooperate and an interference fit is allowed for in the lapping and subsequently obtained in tightening up the studs 50. The spherical joint between the mounting member extension 47 and the tiltable member 48, 49 thus enables the latter to tilt upon the extension 47 in any vertical plane. In this context, and in what follows, the vertical is considered to coincide with the centre line CL indicated in chain dotted lines of the rotor mounting member 28. This line is in fact substantially vertical when the helicopter is in its normal flying attitude.

To prevent the tiltable member 48, 49 from rotating upon the mounting member 28, 47 about the axis of rotation of the rotor, which in its mean position coincides with the vertical centre line CL, a cap member 54 which completes the top of the upper half 48 of the tiltable member, being secured thereto by studs 55, is provided with a splined boss 56 carrying a splined shaft 57 connected by means of a universal joint, generally indicated at 58, with a plug 59 secured in a central recess of a trumpet-shaped part 60 secured to the upper part of the spherical extension 47 of the rotor mounting member 28. This trumpet-shaped part serves partially to stiffen the spherical extension 47 and partly as a guide for the working fluid which flows from the trunk 32 through the tubular lower part 28 of the rotor mounting member into the hollow spherical extension 47 of the same member, the lower part of which is also provided with an annular fairing 61 which, together with the trumpet-shaped part 60, forms a duct or passage for the working fluid of streamlined form and without abrupt change of cross-section whereby a smooth and progressive transition from axial to radial flow of the fluid is obtained. This passage terminates in an annular orifice 62 which extends all round the spherical extension 47 except where it is interrupted by narrow elements 63 of the extension 47 which are left to provide an integral connection between the top and bottom halves of the extension 47 (see Fig. 5). Corresponding with the annular orifice 62 of the spherical extension 47 is an interrupted annular orifice 64 provided in the top half 48 of the tiltable member which continues the passage for the working fluid in a radial direction.

Externally of the tiltable member 48, 49 is mounted a rotative rotor hub 65. This rotates on ball thrust bearings 66, 67, supported respectively in the lower half 49 of the tiltable member and in the cap member 54 completing its upper half 48. The outer race of the bearing 67 is carried in an extension 68 secured by studs 69 to the hub 65 and this race is locked by a threaded cover 70 enclosing the top of the hub. Gas sealing of the clearance between the hub 65 and the lower half 49 of the tiltable member is provided by a number of spring rings 71 mounted in grooves of a flanged ring 72 secured to the part 49, the rings 71 bearing against an internal cylindrical face of a flanged ring 73 carried by the hub.

The hub 65 is provided with three integral extensions 74 constituting blade root housings in which are articulated blade mounting stubs 75. In order that the blades may be free to vary their coning angle and to have some freedom to lead and lag from their mean radial positions, the inboard ends of the stubs 75 are formed with male spherical faces 76 which are engaged by corresponding female spherical faces of blade housing nuts 77 which screw into the blade housing 74. The inner spherical face of the blade housing nut 77 is provided with annular grooves into which are moulded inserts 77a of graphite impregnated material constituting a self-lubricating gas seal between the blade housing nut 77 and the spherical faces 76 on the inboard ends of the blade mounting stubs 75. Damping of lead/lag and coning movements of the blades is provided by rings 78 of friction material which are pressed against internal spherical faces of the blade mounting stubs 75 by springs 79 mounted in recesses of members 80 carrying the friction ring 78 and slidable on spigots 81 secured to the hub 65.

Rotatable on the blade mounting stubs 75 are blade roots 82 being mounted by means of two ball thrust bearings, of which the outboard, 83, carries the centrifugal loading of the blade and the inboard, 84, is a pre-loading bearing, the pre-load being applied by means of a pre-load nut 85 locked by a lock nut 86 and tab washer 87.

Gas sealing of the clearance between the blade root 82 and blade mounting stub 75 is obtained by three spring rings 88 mounted in grooves at the outboard end of the blade mounting stub 75 and bearing on an internal cylindrical surface of an extension member 89 secured to the blade root 82. It will be noted that in both the ring seals 88, 89 and 71, 73, the relative movement is circumferential and not axial as is the case with the ring seals of internal combustion engine pistons.

Variation of pitch angle of the blade is accommodated by rotation of the blade root 82 on the blade mounting stub 75 and this pitch variation is controlled and regulated by means of connections between the blade roots and a swash plate device mounted coaxially with the rotor mounting member 28. Each blade root 82 carries a lug 90 into which is screwed a hollow bolt 91 terminating in a pin 92 on which is mounted by means of a spherical bush 93 an eye 131 carried by one end of a link 94 (see Figs. 3 and 4); the other end of the link 94 is connected also by means of an eye 132 and a spherical bush (not known) with an arm 95 rigidly secured to a ring 96 which is rotatably mounted by means of a ball bearing 97 on a swash plate member 98 carried by means of a gimbal mounting 99, 100 on a sleeve 101 embracing the rotor mounting member 28. The swash plate member 98 is provided with a lug 102 pivoted at 103 to the control column 34. Manipulation of the control column causes the swash plate to be tilted in any desired vertical plane.

The rotor blades are constrained against "flapping" relative to the hub, i. e. the path swept by the blade tips is maintained coaxial with the hub by means of a linkage. This mechanism consists of a central vertical extension 125 of the cover 70 on which is slidable a collar 126 which is connected to the blade roots 82 by links 127 having ball and socket joints 128 and 129 at each end. It will be clear that this linkage ensures that all the blades have the same coning angle relative to the hub.

The operation of the swash plate device is as follows:

If the common axis of the hub and the path swept by the blade tips does not coincide with the axis of the swash plate, the linkages 90, 94, 95 impose a cyclical variation of blade pitch angle; as the lug 90 lies forward of the radial axis of the blade with reference to the direction of rotation, indicated by an arrow in Fig. 3, the phase of the cyclical pitch variation will be such as to give rise to an aerodynamic couple acting on the rotor tending to restore coaxiality or parallelism of the rotor and the swash plate, i. e. to bring the axis of rotation of the hub into a position in which it coincides with or is parallel to the axis of the swash plate. (Coincidence will only occur when the axis of the swash plate coincides with the centre line of the rotor mounting member 28.) The amplitude of the cyclical blade pitch variation induced by a relative inclination of the axes of the hub and the swash plate varies with the magnitude of this relative inclination and the ratio between them depends upon the position of the eye 131 at the upper end of the link 94. Provision is made for adjusting this ratio by altering the position of the bolt 91 relative to the lug 90 with which it is in threaded engagement. In Fig. 3 the bolt 91 is adjusted in the position giving the minimum available ratio of amplitude of blade pitch variation to inclination of hub axis to swash plate axis; although several threads of the bolt 91 are left projecting from the outboard end of the lug 90, further adjustment to reduce this projection would result in the links 94 fouling a part of the hub. In Fig. 4 a position of adjustment is shown giving a greater value of the above-mentioned ratio, the head of the bolt 91 being right up to the lug 90 and the lock-nut 130 being put on the other side of the lug. This does not represent the total range of adjustment, however, as a further increase of the above-mentioned ratio can be obtained by threading the bolt 91 into the lug 90 the other way round, so that the pin 92 carrying the spherical bush 93 engaging the eye 131 is on the outboard side of the lug 90 and this further adjustment can be continued until only enough threads of the bolt 91 are left projecting from the inboard end of the lug 90 to accommodate the lock-nut 130. The total range of values of the above-mentioned ratio covered by the range of adjustment herein described is from 1/1 to 5/1 (but there is a short range midway between these values which is unobtainable owing to the thickness of the lug 90). In order to accommodate the length of the link 94 to the adjustment above mentioned of the bolt 91, the shanks of the eyes 131 and 132 are provided with threads of opposite hand engaging corresponding internal threads of the link 94. Lock-nuts 133, 134 are provided for locking the eyes 131, 132 after adjustment of the effective length of the link 94. This latter adjustment is also used for initially equalising the pitch angles of the blades. It will also be seen that variation of coning angle of all the blades together induces an equal and simultaneous variation of the blade pitch angles through the action of the linkages 94 et cetera which operate in such a way that increase of coning angle brings about a decrease of blade pitch angle and vice versa; this characteristic conduces to stability in vertical gusts and provides automatic regulation of the rotor R. P. M. when power output is varied. It also ensures that if the power is cut off the blade pitch angle assumes a value appropriate to auto-rotation. The ratio between variation of coning angle and change of blade pitch angle can also be adjusted by adjusting the bolts 91 but this ratio is not the same as that between the amplitude of cyclic blade pitch variation and inclination of the hub axis to the swash plate axis because coning of the blades takes place about the centre of the spherical joint 76 which is situated outboard from the centre of the rotor hub and its mounting member.

The tendency explained above of the axis of rotation of the rotor to remain coincident or parallel with the axis of the swash plate and to return to such a position if disturbed, together with the interaction explained above of the coning angle and the mean blade pitch angle, ensure that the rotor is stable in all kinds of manoeuvres and in gusty air. Control of the attitude of the rotational axis of the rotor relative to the airframe is readily obtained by displacing the axis of the swash plate by means of the pilot's controls as above described, the rotational axis of the rotor being caused to follow all displacements of the axis of the swash plate by means of the indirect control supplied by the linkage 94 et cetera.

The sleeve 101 is slidable upon the rotor mounting member 28 and is provided with a lug 104 carrying a pin 105 engaging in a striking fork 106 pivoted on a bracket 107 secured to the mounting member 28. The striking fork 106 is pivotally connected at 108 to the upright rod 41, shown in Fig. 1. Movement of the pitch control lever 36 (see Fig. 1) is transmitted by the system of rods and levers 37, 38, 39, 40, 41, 106, to the sleeve 101 to shift the latter up or down on the mounting member 28. By this means the swash plate device is moved bodily up and down, and this displacement being transmitted by means of arms 95, links 94 and lugs 90 to the blade roots 82, causes an equal and simultaneous variation of the pitch angle of all the blades.

The axes of the blade housings 74 are given a slight upward inclination corresponding to the normal coning angle of the blades, and are so positioned that with the blades in their normal coning angle the radial axes of the blades intersect one another at the centre of the spherical joint between the mounting member extension 47 and the packing rings 52, 53, i. e. the centre about which tilting of the tiltable member 48, 49 which supports the hub takes place.

A rotor brake is provided comprising a brake drum 109 externally finned for air-cooling and secured to the lower face of the hub 65 by studs 110 and internally expanding brake shoes 111 carried by a flanged plate 112 secured by studs 113 to the lower half 49 of the tiltable member. The control mechanism of the brake shoes is not illustrated and may be of any suitable known type. The splined shaft 57 and universal joint 58 which restrain the tiltable member from rotating on the rotor mounting member 28, 47 also serve to transmit the braking torque to the latter member.

Within each blade root stub 75 is a tubular member 114 with a flared inboard end which registers with an orifice 115 in the wall of the hub 65 which orifice in turn registers with the annular orifice 64 of the tiltable member 48, 49. The tube 114 thus provides a duct for the working fluid in continuation of the passage formed between the parts 60 and 61 and the orifices 62, 64, 74a.

Referring to Fig. 6, it will be seen that the blade root 82 is reduced in cross section in an outboard direction and merges into a hollow spar 115 constituting the main structural member of the rotor blade 30. The secondary structure of the blade is indicated at 116 but will not be described in detail as it constitutes no part of this invention, but may be as disclosed and claimed in my copending application Serial No. 484,064 filed coincidentally with the present case. The tube 114 constituting the duct for the working fluid is extended within the blade root 82 and terminates at 117 at which point it fits tightly within the interior of the spar 115, being secured thereto in any convenient manner. It will thus be seen that the tube 114 rotates with the blade 38 when the pitch angle varies and is therefore movable relative to the blade mounting stub 75. To prevent the tube 114 from binding on the blade mounting stub 75 a considerable clearance between these members is provided in order to allow for expansion effects of the tube 114 which is exposed to the action of the hot gases flowing from the rotor mounting member into the blades. The spar 115 thus constitutes the duct for the working fluid within the blade itself, the outer part of which is illustrated in Figs. 7 to 9 in which it will be seen that the blade 38 terminates in a jet reaction nozzle device 118, the internal conformation of which comprises an elbow duct 119 communicating with the hollow spar 115 and a convergent/divergent nozzle 120 terminating in a nozzle orifice 121 which is flush with the trailing edge of the blade and of elongated shape conforming to the blade profile. It will be seen from Fig. 8 that the whole nozzle device is of highly flattened form adapted to fair into the blade contour. The forward part of the nozzle device includes a weight 122 provided for mass balancing of the blade. This weight being placed well forward of the leading edge of the blade serves to bring the centre of gravity of the whole blade into a sufficiently forward position to prevent blade flutter in accordance with known principles.

In Figs. 10 and 11 the outboard end of a rotor blade having an alternative nozzle arrangement is shown. In this the nozzle element 123 constitutes a continuation of the hollow blade-spar 115 (shown in other figures) and the nozzle orifice 124 is of elongated narrow form being situated on the upper (low pressure) surface of the blade at about the region of maximum thickness. This arrangement is considered to have certain advantages as hereinbefore stated.

What I claim is:

1. In a helicopter, a bladed lifting rotor, a non-rotative mounting therefor, said rotor incorporating a tiltable and rotatable hub and a plurality of sustaining blades mounted with freedom for flapping movement about axes offset from the hub axis whereby the plane of rotation of the blade tips may assume various inclinations with reference to the body of the aircraft and whereby the axis of rotation of the tiltable hub tends to remain coincident with the axis of the cone generated by the radial axes of the blade in normal flight, the sustaining blades further being mounted for variation of pitch angle and the rotor incorporating mechanism for cyclically varying the blade pitch angle, said mechanism being automatically operative upon deviation of the blade tip path from a given plane to vary the pitch in a sense tending to restore the blade tip path to said given plane, and in combination therewith rotor driving means including jet reaction devices mounted on or incorporated in the lifting blades of the rotor and means for supplying the jet reaction devices with a stream of reactive fluid, whereby no torque reaction is transmitted from the rotor to its non-rotative mounting.

2. In a helicopter, an airframe, a hollow rotor mounting member rigidly mounted thereon, a tiltable member mounted on the mounting member by joint means allowing the former to tilt relatively to the latter in any vertical plane, but preventing relative rotation about a substantially vertical axis, a rotor comprising a hub freely rotatable on the tiltable member about a substantially vertical axis and a number of lifting rotor blades extending radially from the hub and articulated thereon for variation of blade pitch angle, a trunk for delivering fluid to the hollow mounting member, ducts within the mounting member and blades and registering orifices in the mounting member, tiltable member, hub and blades for delivering the fluid from the mounting member into the blades and jet reaction nozzles situated on the blades and communicating with said ducts for ejecting the fluid in a direction opposite to that of rotation of the rotor and thereby driving it without imposing torque reaction on the mounting member and airframe.

3. In a helicopter as claimed in claim 2, means for sealing the articular clearances between the mounting member, tiltable member, hub and blades against escape of the working fluid.

4. In a helicopter as claimed in claim 2, a rotor blade having a jet reaction nozzle device located thereon with its centre of gravity forward of the mass centre of the rest of the blade so that the mass of the nozzle device contributes to the mass balancing of the blade, thereby assisting to prevent blade flutter.

5. In a helicopter as claimed in claim 2, a rotor blade incorporating a jet reaction nozzle situated substantially at the tip of the blade.

6. In a helicopter as claimed in claim 2, a rotor blade incorporating a jet reaction nozzle device, said device having a nozzle orifice situated at the trailing edge of the blade and lying flush therewith, the orifice being of radially elongated form and the whole nozzle device being faired into the blade contour.

7. In a helicopter as claimed in claim 2, a rotor blade incorporating a jet reaction nozzle device having a jet orifice situated on the upper face of the blade at about the region of maximum thickness the orifice being of radially elongated form.

8. In a helicopter as claimed in claim 2, means connecting the blades to the hub and constraining the path swept by the blade tips to be coaxial with the rotative axis of the hub.

9. In a helicopter as claimed in claim 2, means connecting the blades to the hub permitting the blades to vary their coning angle with respect to the hub, but restraining them against flapping.

10. In a helicopter as claimed in claim 2, a swash plate device tiltable with respect to the mounting member in any vertical plane, pilot's control means regulating the tilt of the swash plate device, and connections between the latter and the rotor blades for imposing and regulating cyclical variation of blade pitch angle.

11. In a helicopter as claimed in claim 2, a swash plate device tiltable with respect to the mounting member in any vertical plane, pilot's control means regulating the tilt of the swash plate device, and connections between the latter and the rotor blades for imposing and regulating cyclical variation of blade pitch angle, said connections embodying adjustable means for varying the ratio between the inclination of the swash plate device relative to the axis of rotation of the hub and the amplitude of the ensuing cyclical variation of blade pitch.

12. In a helicopter as claimed in claim 2, means controllable by the pilot for varying the blade pitch angle of all the rotor blades equally and simultaneously.

13. In a helicopter as claimed in claim 2, joint means connecting the tiltable member to the rotor mounting member so constructed that the centre about which the former tilts is situated on the rotational axis of the rotor.

14. In a helicopter as claimed in claim 2, joint means connecting the tiltable member to the rotor mounting member so constructed that the centre about which the former tilts is situated on the rotational axis of the rotor approximately at the vertex of the cone generated by the radial axes of the blades in normal flight.

15. In a helicopter as claimed in claim 2, means connecting the rotor blades to the hub permitting a limited degree of leading and lagging of the blades from their mean radial positions independently of one another.

16. In a rotary wing aircraft, a sustaining rotor incorporating a tiltable and rotatable hub and a plurality of sustaining blades mounted with freedom for flapping movement about axes offset from the hub axis whereby the plane of rotation of the blade tips may assume various inclinations with reference to the body of the aircraft and whereby the axis of rotation of the tiltable hub tends to remain coincident with the axis of the cone generated by the radial axes of the blades in normal flight, the sustaining blades further being mounted for variation of pitch angle and the rotor incorporating mechanism for cyclically varying the blade pitch angle, said mechanism being automatically operative upon deviation of the blade tip path from a given plane to vary the pitch in a sense tending to restore the blade tip path to said given plane, and rotor driving means mounted on said blades and adapted to react between the blades and the atmosphere and constructed to impart a driving force to said rotor effective to sustain the aircraft without appreciable torque reaction between the rotor and the body of the aircraft.

17. In an aircraft, the arrangement of claim 16, with controllable means providing for tilting in all directions of the blade tip path relative to the aircraft.

18. In an aircraft, the arrangement of claim 16, with controllable means providing for tilting in all directions of the blade tip path relative to the aircraft, and in which the rotor hub is mounted for tilting about a center approximately coinciding with the center of intersection of the rotor axis of rotation and the longitudinal axes of the rotor blades.

19. In a rotary wing aircraft, a non-tilting structure, a sustaining rotor comprising a rotatable member tiltable in all directions with respect to said structure, rotor blade means mounted for variable coning with relation to said member and having means for variation of effective blade pitch, a rotor blade pitch controlling base member having a predeterminable position relative to said non-tilting structure, and pitch control connections between said blade means and said base member constructed to effect variation of blade pitch upon tilting of said first-mentioned member and upon movement of the blade means in the coning sense, the center of tilt of said rotatable and tiltable member and the center of coning movement of the blade means being spaced apart, whereby the extent of blade pitch change for a given angular range of coning is different from the extent of blade pitch change for the same angular range of tilting of said member.

20. A construction according to claim 2 and further including blade pitch controlling mechanism incorporating connections so coupled to the blade means as to cause cyclic blade pitch variation in a sense tending toward restoration of the hub to a predetermined equilibrium position upon angular displacement thereof from said position.

21. In a rotary wing aircraft, a non-tilting structure, a sustaining rotor comprising a rotatable member tiltable in all directions with respect to said structure, rotor blade means mounted for variable coning with relation to said member and having means for variation of effective blade pitch, and mechanism for introducing and controllably regulating cyclic blade pitch variation, said mechanism further including a rotor blade pitch controlling base member movable to different positions with relation to said non-tilting structure, and further including pitch control connections between said blade means and the said base member constructed to effect variation of blade pitch upon tilting of said first-mentioned member and upon movement of the blade means in the coning sense.

CYRIL GEORGE PULLIN.

REFERENCES CITED

The following references are of record in the file of this patent:

UNITED STATES PATENTS

| Number | Name | Date |
|---|---|---|
| 1,982,968 | Stalker | Dec. 4, 1934 |
| 1,982,969 | Stalker | Dec. 4, 1934 |
| 2,023,105 | Smith | Dec. 3, 1935 |
| 2,030,578 | Flettner | Feb. 11, 1936 |
| 2,041,789 | Stalker | May 26, 1936 |
| 2,041,796 | Stalker | May 26, 1936 |
| 1,919,142 | Wetzel | July 18, 1933 |
| 1,722,489 | Bott | July 30, 1929 |
| 1,959,697 | Tracy | May 22, 1934 |
| 2,356,692 | Platt | Aug. 22, 1944 |
| 1,669,758 | Isacco et al. | May 15, 1928 |
| 1,848,389 | Sikorsky | Mar. 8, 1932 |
| 2,256,635 | Young | Sept. 23, 1941 |

FOREIGN PATENTS

| Number | Country | Date |
|---|---|---|
| 816,504 | France | May 3, 1937 |
| 838,828 | France | Dec. 16, 1938 |
| 476,596 | Great Britain | Dec. 13, 1937 |

Certificate of Correction

Patent No. 2,429,646.   October 28, 1947.

CYRIL GEORGE PULLIN

It is hereby certified that errors appear in the printed specification of the above numbered patent requiring correction as follows: Column 6, line 45, for the word "known" read *shown*; column 9, line 56, for "blade" read *blades*; and that the said Letters Patent should be read with these corrections therein that the same may conform to the record of the case in the Patent Office.

Signed and sealed this 13th day of April, A. D. 1948.

[SEAL]

THOMAS F. MURPHY,
*Assistant Commissioner of Patents.*